United States Patent
Donahoo et al.

(10) Patent No.: US 8,893,512 B2
(45) Date of Patent: Nov. 25, 2014

(54) COMPRESSOR BLEED COOLING FLUID FEED SYSTEM

(75) Inventors: Eric E. Donahoo, Chuluota, FL (US); Christopher W. Ross, Oviedo, FL (US)

(73) Assignee: Siemens Energy, Inc., Orlando, FL (US)

(*) Notice: Subject to any disclaimer, the term of this patent is extended or adjusted under 35 U.S.C. 154(b) by 504 days.

(21) Appl. No.: 13/280,474

(22) Filed: Oct. 25, 2011

(65) Prior Publication Data
US 2013/0098062 A1 Apr. 25, 2013

(51) Int. Cl.
| F02C 7/12 | (2006.01) |
| F01D 5/08 | (2006.01) |
| F02C 6/08 | (2006.01) |
| F02C 7/18 | (2006.01) |

(52) U.S. Cl.
CPC . *F01D 5/081* (2013.01); *F02C 7/18* (2013.01); *F02C 7/12* (2013.01); *F02C 6/08* (2013.01)
USPC .............................. 60/806; 60/785; 416/97 R

(58) Field of Classification Search
CPC ............... F02C 6/08; F02C 9/18; F02C 7/18; F01D 5/081; F01D 25/12
USPC ........................... 60/782, 785, 806; 416/97 R
See application file for complete search history.

(56) References Cited

U.S. PATENT DOCUMENTS

| 3,452,542 | A * | 7/1969 | Saferstein et al. ............... 60/752 |
| 5,187,931 | A * | 2/1993 | Taylor .............................. 60/806 |
| 6,334,297 | B1 * | 1/2002 | Dailey et al. .................... 60/785 |
| 7,234,918 | B2 * | 6/2007 | Brillert et al. ............... 415/173.5 |
| 7,823,389 | B2 * | 11/2010 | Seitzer et al. ................... 60/782 |
| 2002/0148214 | A1 * | 10/2002 | Tiemann ...................... 60/39.17 |
| 2003/0167775 | A1 * | 9/2003 | Soechting et al. .............. 60/785 |
| 2005/0050901 | A1 * | 3/2005 | Little .............................. 60/785 |
| 2007/0175220 | A1 * | 8/2007 | Bland ............................. 60/751 |
| 2010/0031673 | A1 * | 2/2010 | Maltson ......................... 60/796 |
| 2012/0060507 | A1 * | 3/2012 | King et al. ..................... 60/782 |
| 2012/0060509 | A1 * | 3/2012 | Myoren et al. ................. 60/785 |
| 2014/0010634 | A1 * | 1/2014 | Meyer et al. .................. 415/116 |

* cited by examiner

*Primary Examiner* — William H Rodriguez

(57) ABSTRACT

A compressor bleed cooling fluid feed system for a turbine engine for directing cooling fluids from a compressor to a turbine airfoil cooling system to supply cooling fluids to one or more airfoils of a rotor assembly is disclosed. The compressor bleed cooling fluid feed system may enable cooling fluids to be exhausted from a compressor exhaust plenum through a downstream compressor bleed collection chamber and into the turbine airfoil cooling system. As such, the suction created in the compressor exhaust plenum mitigates boundary layer growth along the inner surface while providing flow of cooling fluids to the turbine airfoils.

13 Claims, 1 Drawing Sheet

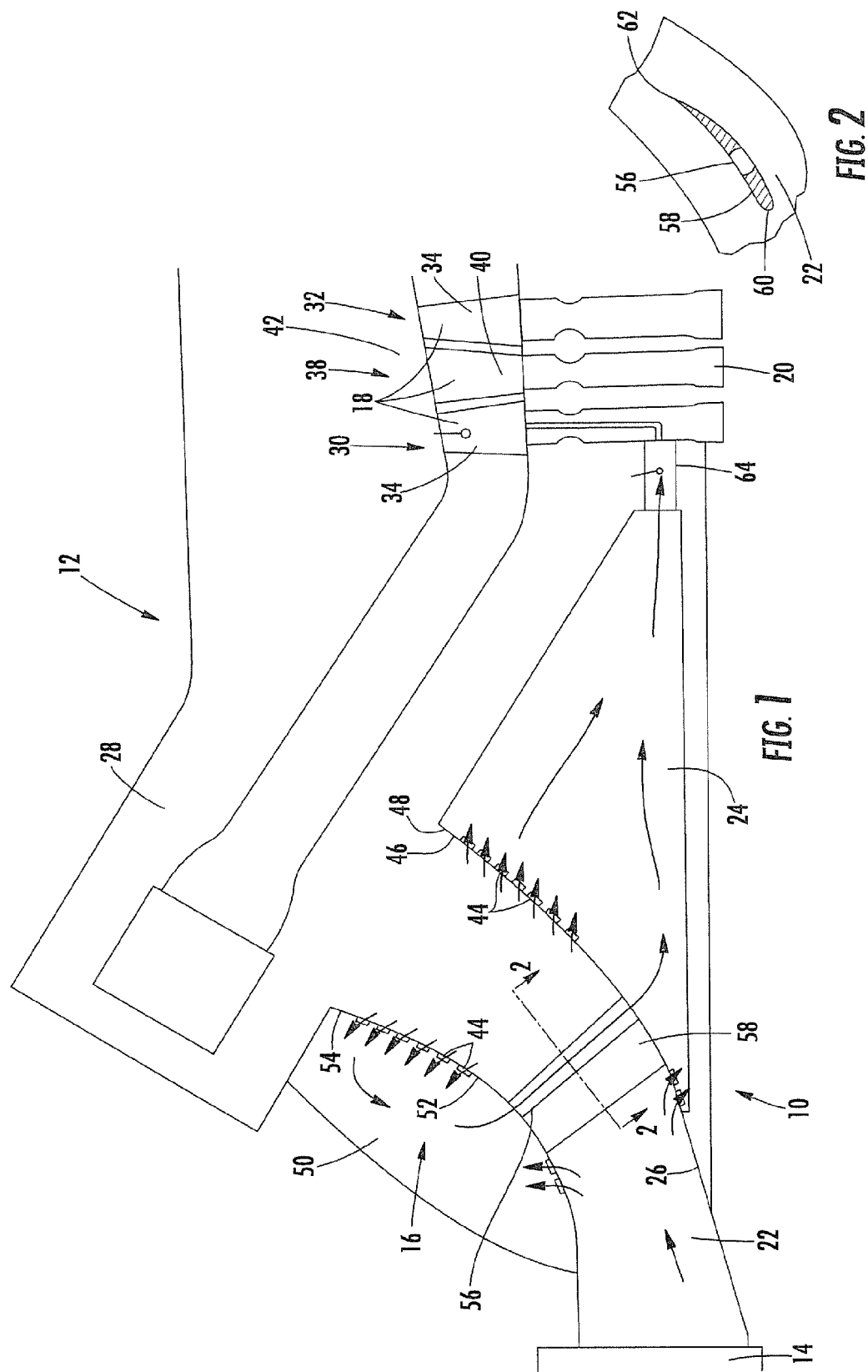

COMPRESSOR BLEED COOLING FLUID FEED SYSTEM

STATEMENT REGARDING FEDERALLY SPONSORED RESEARCH OR DEVELOPMENT

Development of this invention was supported in part by the United States Department of Energy, Advanced Turbine Development Program, Contract No. DE-FC26-05NT42644. Accordingly, the United States Government may have certain rights in this invention.

FIELD OF THE INVENTION

This invention is directed generally to turbine engines, and more particularly to cooling fluid feed systems for turbine airfoils in turbine engines.

BACKGROUND

Typically, gas turbine engines include a compressor for compressing air, a combustor for mixing the compressed air with fuel and igniting the mixture, and a turbine blade assembly for producing power. Combustors often operate at high temperatures that may exceed 2,500 degrees Fahrenheit. Typical turbine combustor configurations expose turbine blade assemblies to these high temperatures. As a result, turbine blades and turbine vanes must be made of materials capable of withstanding such high temperatures. Turbine blades, vanes and other components often contain cooling systems for prolonging the life of these items and reducing the likelihood of failure as a result of excessive temperatures.

Typically, turbine vanes extend radially inward from a vane carrier and terminate within close proximity of a rotor assembly, and turbine blades extend radially outward and terminate within close proximity of the vane carrier. The turbine vanes and blades typically include a plurality of cooling channels positioned in internal aspects therein to cool the vanes and blades from heat acquired from the combustor exhaust gases. As the engines run at ever increasing loads, a need exists for novel cooling systems for the turbine airfoils.

SUMMARY OF THE INVENTION

This invention relates to a compressor bleed cooling fluid feed system for a turbine engine for directing cooling fluids from a compressor to a turbine airfoil cooling system to supply cooling fluids to one or more airfoils of a rotor assembly. The compressor bleed cooling fluid feed system may enable cooling fluids to be exhausted from a compressor exhaust plenum through a downstream compressor bleed collection chamber and into the turbine airfoil cooling system. As such, the suction created in the compressor exhaust plenum mitigates boundary layer growth along the inner surface while providing flow of cooling fluids to the turbine airfoils.

The turbine engine may include one or more combustors positioned upstream from a rotor assembly. The rotor assembly may include one or more rows of turbine blades extending radially outward from a rotor. A first row of turbine vanes may be attached to a vane carrier. The turbine vanes may each extend radially inward and terminate proximate to the rotor assembly upstream of the first row of turbine blades. The turbine engine may also include a compressor positioned upstream from the combustor. One or more compressor exhaust plenums may extend between the compressor and the combustor. One or more downstream compressor bleed collection chambers may be in fluid communication with the compressor exhaust plenum through at least one compressor bleed orifice in a wall forming a downstream side of the compressor exhaust plenum. The downstream compressor bleed collection chamber may be in fluid communication with at least one turbine airfoil cooling system configured to supply cooling fluids to one or more airfoils within the rotor assembly.

The compressor bleed cooling fluid feed system may also include an upstream compressor bleed collection chamber in fluid communication with the downstream compressor bleed collection chamber and in fluid communication with the compressor exhaust plenum through at least one compressor bleed orifice in a wall forming an upstream side of the compressor exhaust plenum. In one embodiment, there may exist two or more upstream compressor bleed collection chamber, two or more downstream compressor bleed collection chamber, or two or more of each of the upstream and downstream compressor bleed collection chambers. A compressor bleed collection conduit may extend between the upstream compressor bleed collection chamber and the downstream compressor bleed collection chamber. The compressor bleed collection conduit may extend at least partially through the compressor exhaust plenum. The turbine engine may also include one or more struts positioned in the compressor exhaust plenums. In one embodiment, the compressor bleed collection conduit may be contained within the strut.

The compressor bleed orifice in the wall forming the downstream side of the compressor exhaust plenum may include a plurality of orifices with one or more orifices being positioned upstream of the strut and one or more orifices being positioned downstream of the strut. Similarly, the compressor bleed orifice in the wall forming the upstream side of the compressor exhaust plenum may include a plurality of orifices with one or more orifices being positioned upstream of the strut and one or more orifices being positioned downstream of the strut.

The compressor bleed cooling fluid feed system may also include a preswirler positioned inline upstream of the turbine airfoil cooling system configured to supply cooling fluids to one or more airfoils within the rotor assembly. The preswirler may impart a tangential vector to the axial cooling fluid flow in the direction of rotation of the rotor assembly.

An advantage of this invention is that the suction created in the compressor exhaust plenum by the bleeding of the compressor fluids mitigates boundary layer growth along the inner surface while providing flow of cooling fluids to the turbine airfoils. The bleed compressor fluids may be used for cooling applications or may be exhausted into the atmosphere. These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

FIG. 1 is a cross-sectional side view of a portion of a turbine engine including a compressor bleed cooling fluid feed system of this invention.

FIG. 2 is a cross-sectional view of a strut within a compressor exhaust plenum taken along section line 2-2 in FIG. 1.

DETAILED DESCRIPTION OF THE INVENTION

As shown in FIGS. 1-2, this invention is directed to a compressor bleed cooling fluid feed system 10 for a turbine engine 12 for directing cooling fluids from a compressor 14 to a turbine airfoil cooling system 16 to supply cooling fluids to one or more airfoils 18 of a rotor assembly 20 is disclosed. The compressor bleed cooling fluid feed system 10 may enable cooling fluids to be exhausted from a compressor exhaust plenum 22 through a downstream compressor bleed collection chamber 24 and into the turbine airfoil cooling system 16. As such, the suction created in the compressor exhaust plenum 22 mitigates boundary layer growth along the inner surface 26 while providing flow of cooling fluids to the turbine airfoils 18.

As shown in FIG. 1, the turbine engine 12 may be formed from one or more combustors 28 positioned upstream from a rotor assembly 20. The rotor assembly 20 may include at least one airfoil 18. In one embodiment, the rotor assembly 20 may include first and second rows 30, 32 of turbine blades 34 extending radially outward from a rotor. The turbine engine 12 may also include a compressor 14 positioned upstream from the combustor 28. A first row 38 of turbine vanes 40 may be attached to a vane carrier 42. The turbine vanes 40 may each extend radially inward and terminate proximate to the rotor assembly 20 upstream of the first row 38 of turbine blades 34.

The turbine engine 12 may also include one or more compressor exhaust plenums 22 extending between the compressor 14 and the combustor 28. The plenum 22 may have any appropriate shape and be formed from any material capable of withstanding the high temperature environment and the vibrations during normal turbine engine operation. The turbine engine 12 may also include one or more downstream compressor bleed collection chambers 24 in fluid communication with the compressor exhaust plenum 22 through one or more compressor bleed orifices 44 in a wall 46 forming a downstream side 48 of the compressor exhaust plenum 22. The downstream compressor bleed collection chamber 24 may be in fluid communication with at least one turbine airfoil cooling system 16 configured to supply cooling fluids to one or more airfoils 18 within the rotor assembly 20.

The compressor bleed cooling fluid feed system 10 may also include an upstream compressor bleed collection chamber 50 in fluid communication with the downstream compressor bleed collection chamber 24 and in fluid communication with the compressor exhaust plenum 22 through at least one compressor bleed orifice 44 in a wall 52 forming an upstream side 54 of the compressor exhaust plenum 22. The compressor bleed cooling fluid feed system 10 may also include a compressor bleed collection conduit 56 extending between the upstream compressor bleed collection chamber 50 and the downstream compressor bleed collection chamber 24. The compressor bleed collection conduit 56 may extend at least partially through the compressor exhaust plenum 22.

As shown in FIGS. 1 and 2, the turbine engine 12 may include one or more struts 58 positioned in the compressor exhaust plenum 22. In at least one embodiment, the compressor bleed collection conduit 56 may be contained within the strut 58. The strut 58 may have any appropriate configuration. In at least one embodiment, the strut 58 may have a leading edge 60 and a trailing edge 62. The width of the strut 58 may increase between the leading and trailing edges 60, 62. The strut 58 may be formed from any material capable of withstanding the environment within the compressor exhaust plenum 22 and having sufficient strength to support the compressor exhaust plenum 22 and other components of the turbine engine 12.

As shown in FIG. 1, there may exist a plurality of compressor bleed orifices 44 in the wall 46 forming a downstream side 48 of the compressor exhaust plenum 22. One or more of the compressor bleed orifices 44 may be positioned in the downstream side 48 upstream from the strut 58, and one or more of the compressor bleed orifices 44 may be positioned downstream from the strut 58. There may also exist a plurality of compressor bleed orifices 44 in the wall 52 forming an upstream side 54 of the compressor exhaust plenum 22. One or more of the compressor bleed orifices 44 may be positioned in the upstream side 54 upstream from the strut 58, and one or more of the compressor bleed orifices 44 may be positioned downstream from the strut 58.

The turbine engine 12 may also include a preswirler 64 positioned inline upstream of the turbine airfoil cooling system 16 configured to supply cooling fluids to one or more airfoils 18 within the rotor assembly 20. The preswirler 64 may induce swirl into the cooling fluids flowing from the downstream compressor bleed collection chamber 24 because swirl is diminished in the upstream and downstream compressor bleed collection chambers 50, 24. The preswirler 64 may be formed from any configuration that redirects cooling fluid flow to include a tangential component in additional to an axial component to the flow. Thus, the preswirler 64 directs the cooling fluids in a same direction as the direction of rotation for the rotor assembly 20.

During use, the compressor 14 compresses air that passes through the compressor exhaust plenum 22 and into the combustor 28. While passing through the compressor exhaust plenum 22, at least a portion of the cooling fluids are exhausted into the compressor bleed cooling fluid feed system 10 through the compressor bleed orifices 44. The cooling fluids passing through the wall 52 on the upstream side 54 enter into the upstream compressor bleed collection chamber 50. Cooling fluids are exhausted from the upstream compressor bleed collection chamber 50 and passed through the conduit 56 positioned in the compressor exhaust plenum 22 and into the downstream compressor bleed collection chamber 24. The cooling fluids are then exhausted through one or more preswirlers 64 and into the turbine airfoil cooling system 16.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A turbine engine, comprising:

at least one combustor positioned upstream from a rotor assembly, wherein the rotor assembly includes at least one row of turbine blades extending radially outward from a rotor;

a compressor positioned upstream from the at least one combustor;

a first row of turbine vanes attached to a vane carrier, wherein the turbine vanes each extend radially inward and are positioned upstream of the at least one row of turbine blades;

at least one compressor exhaust plenum extending between the compressor and the at least one combustor;

at least one compressor bleed collection chamber in fluid communication with the at least one compressor exhaust plenum through at least one compressor bleed orifice in a wall forming the at least one compressor exhaust plenum;

wherein the at least one compressor bleed collection chamber comprises at least one downstream compressor bleed collection chamber in fluid communication with the at least one compressor exhaust plenum through at least one compressor bleed orifice in a wall forming a downstream side of the at least one compressor exhaust plenum;

wherein the at least one downstream compressor bleed collection chamber is in fluid communication with at least one turbine airfoil cooling system configured to supply cooling fluids to at least one airfoil within the rotor assembly;

an upstream compressor bleed collection chamber in fluid communication with the at least one downstream compressor bleed collection chamber and in fluid communication with the at least one compressor exhaust plenum through at least one compressor bleed orifice in a wall forming an upstream side of the at least one compressor exhaust plenum;

a compressor bleed collection conduit extending between the upstream compressor bleed collection chamber and the downstream compressor bleed collection chamber;

wherein the compressor bleed collection conduit extends at least partially through the at least one compressor exhaust plenum;

at least one strut positioned in the at least one compressor exhaust plenum and wherein the compressor bleed collection conduit is contained within the at least one strut; and wherein the at least one compressor bleed orifice in a wall forming a downstream side of the at least one compressor exhaust plenum comprises a plurality of orifices with at least one orifice being positioned upstream of the at least one strut and at least one orifice being positioned downstream of the at least one strut.

2. A turbine engine, comprising:

at least one combustor positioned upstream from a rotor assembly, wherein the rotor assembly includes at least one row of turbine blades extending radially outward from a rotor;

a compressor positioned upstream from the at least one combustor;

a first row of turbine vanes attached to a vane carrier, wherein the turbine vanes each extend radially inward and are positioned upstream of the at least one row of turbine blades;

at least one compressor exhaust plenum extending between the compressor and the at least one combustor;

at least one compressor bleed collection chamber in fluid communication with the at least one compressor exhaust plenum through at least one compressor bleed orifice in a wall forming the at least one compressor exhaust plenum;

wherein the at least one compressor bleed collection chamber comprises at least one downstream compressor bleed collection chamber in fluid communication with the at least one compressor exhaust plenum through at least one compressor bleed orifice in a wall forming a downstream side of the at least one compressor exhaust plenum;

wherein the at least one downstream compressor bleed collection chamber is in fluid communication with at least one turbine airfoil cooling system configured to supply cooling fluids to at least one airfoil within the rotor assembly;

an upstream compressor bleed collection chamber in fluid communication with the at least one downstream compressor bleed collection chamber and in fluid communication with the at least one compressor exhaust plenum through at least one compressor bleed orifice in a wall forming an upstream side of the at least one compressor exhaust plenum;

a compressor bleed collection conduit extending between the upstream compressor bleed collection chamber and the downstream compressor bleed collection chamber;

wherein the compressor bleed collection conduit extends at least partially through the at least one compressor exhaust plenum;

at least one strut positioned in the at least one compressor exhaust plenum and wherein the compressor bleed collection conduit is contained within the at least one strut; and wherein the at least one compressor bleed orifice in a wall forming an upstream side of the at least one compressor exhaust plenum comprises a plurality of orifices with at least one orifice being positioned upstream of the at least one strut and at least one orifice being positioned downstream of the at least one strut.

3. A turbine engine, comprising:

at least one combustor positioned upstream from a rotor assembly, wherein the rotor assembly includes at least one row of turbine blades extending radially outward from a rotor;

a compressor positioned upstream from the at least one combustor;

a first row of turbine vanes attached to a vane carrier, wherein the turbine vanes each extend radially inward and are positioned upstream of the at least one row of turbine blades;

at least one compressor exhaust plenum extending between the compressor and the at least one combustor;

at least one compressor bleed collection chamber in fluid communication with the at least one compressor exhaust plenum through at least one compressor bleed orifice in a wall forming the at least one compressor exhaust plenum; and further comprising a preswirler positioned inline upstream of the at least one turbine airfoil cooling system configured to supply cooling fluids to at least one airfoil within the rotor assembly.

4. A turbine engine, comprising:

at least one combustor positioned upstream from a rotor assembly, wherein the rotor assembly includes at least one row of turbine blades extending radially outward from a rotor;

a compressor positioned upstream from the at least one combustor;

a first row of turbine vanes attached to a vane carrier, wherein the turbine vanes each extend radially inward and are positioned upstream of the at least one row of turbine blades;

at least one compressor exhaust plenum extending between the compressor and the at least one combustor;

at least one downstream compressor bleed collection chamber in fluid communication with the at least one compressor exhaust plenum through at least one compressor bleed orifice in a wall forming a downstream side of the at least one compressor exhaust plenum;

wherein the at least one downstream compressor bleed collection chamber is in fluid communication with at least one turbine airfoil cooling system configured to supply cooling fluids to at least one airfoil within the rotor assembly;

an upstream compressor bleed collection chamber in fluid communication with the at least one downstream compressor bleed collection chamber and in fluid communication with the at least one compressor exhaust plenum through at least one compressor bleed orifice in a wall forming an upstream side of the at least one compressor exhaust plenum; and a preswirler positioned inline upstream of the at least one turbine airfoil cooling system configured to supply cooling fluids to at least one airfoil within the rotor assembly.

5. The turbine engine of claim 4, further comprising a compressor bleed collection conduit extending between the upstream compressor bleed collection chamber and the downstream compressor bleed collection chamber.

6. The turbine engine of claim 5, wherein the compressor bleed collection conduit extends at least partially through the at least one compressor exhaust plenum.

7. The turbine engine of claim 6, further comprising at least one strut positioned in the at least one compressor exhaust plenum and wherein the compressor bleed collection conduit is contained within the at least one strut.

8. The turbine engine of claim 7, wherein the at least one compressor bleed orifice in a wall forming a downstream side of the at least one compressor exhaust plenum comprises a plurality of orifices with at least one orifice being positioned upstream of the at least one strut and at least one orifice being positioned downstream of the at least one strut.

9. The turbine engine of claim 8, wherein the at least one compressor bleed orifice in a wall forming an upstream side of the at least one compressor exhaust plenum comprises a plurality of orifices with at least one orifice being positioned upstream of the at least one strut and at least one orifice being positioned downstream of the at least one strut.

10. A turbine engine, comprising:
at least one combustor positioned upstream from a rotor assembly, wherein the rotor assembly includes at least one row of turbine blades extending radially outward from a rotor;
a compressor positioned upstream from the at least one combustor;
a first row of turbine vanes attached to a vane carrier, wherein the turbine vanes each extend radially inward and are positioned upstream of the at least one row of turbine blades;
at least one compressor exhaust plenum extending between the compressor and the at least one combustor;
at least one downstream compressor bleed collection chamber in fluid communication with the at least one compressor exhaust plenum through at least one compressor bleed orifice in a wall forming a downstream side of the at least one compressor exhaust plenum;
wherein the at least one downstream compressor bleed collection chamber is in fluid communication with at least one turbine airfoil cooling system configured to supply cooling fluids to at least one airfoil within the rotor assembly;
an upstream compressor bleed collection chamber in fluid communication with the at least one downstream compressor bleed collection chamber and in fluid communication with the at least one compressor exhaust plenum through at least one compressor bleed orifice in a wall forming an upstream side of the at least one compressor exhaust plenum;
a compressor bleed collection conduit extending between the upstream compressor bleed collection chamber and the downstream compressor bleed collection chamber;
wherein the compressor bleed collection conduit extends at least partially through the at least one compressor exhaust plenum; and
a preswirler positioned inline upstream of the at least one turbine airfoil cooling system configured to supply cooling fluids to at least one airfoil within the rotor assembly.

11. The turbine engine of claim 10, further comprising at least one strut positioned in the at least one compressor exhaust plenum and wherein the compressor bleed collection conduit is contained within the at least one strut.

12. The turbine engine of claim 11, wherein the at least one compressor bleed orifice in a wall forming a downstream side of the at least one compressor exhaust plenum comprises a plurality of orifices with at least one orifice being positioned upstream of the at least one strut and at least one orifice being positioned downstream of the at least one strut.

13. The turbine engine of claim 12, wherein the at least one compressor bleed orifice in a wall forming an upstream side of the at least one compressor exhaust plenum comprises a plurality of orifices with at least one orifice being positioned upstream of the at least one strut and at least one orifice being positioned downstream of the at least one strut.

* * * * *